(12) United States Patent
Hoetzer et al.

(10) Patent No.: US 11,173,898 B2
(45) Date of Patent: Nov. 16, 2021

(54) DRIVER ASSISTANCE SYSTEM FOR A MOTOR VEHICLE

(71) Applicant: Robert Bosch GmbH, Stuttgart (DE)

(72) Inventors: Dieter Hoetzer, Markgroeningen (DE); Lidia-Pilar Verdugo-Lara, Stuttgart (DE); Werner Uhler, Bruchsal (DE)

(73) Assignee: Robert Bosch GmbH, Stuttgart (DE)

( * ) Notice: Subject to any disclaimer, the term of this patent is extended or adjusted under 35 U.S.C. 154(b) by 336 days.

(21) Appl. No.: 16/344,234

(22) PCT Filed: Sep. 12, 2017

(86) PCT No.: PCT/EP2017/072838
§ 371 (c)(1),
(2) Date: Apr. 23, 2019

(87) PCT Pub. No.: WO2018/086784
PCT Pub. Date: May 17, 2018

(65) Prior Publication Data
US 2019/0263395 A1    Aug. 29, 2019

(30) Foreign Application Priority Data
Nov. 11, 2016   (DE) .......................... 102016222219.8

(51) Int. Cl.
*G08G 1/16*       (2006.01)
*B60W 30/09*      (2012.01)
(Continued)

(52) U.S. Cl.
CPC ........ *B60W 30/09* (2013.01); *B60W 30/0956* (2013.01); *B60W 30/12* (2013.01);
(Continued)

(58) Field of Classification Search
CPC .. B60W 30/09; B60W 30/0956; B60W 30/12; B60W 50/0097; B60W 50/14;
(Continued)

(56) References Cited

U.S. PATENT DOCUMENTS 6,292,719 B1 *  9/2001  Seto ................. G08G 1/096716
                                                        701/1
6,438,491 B1 *  8/2002  Farmer .................. G08G 1/164
                                                        701/301
(Continued)

FOREIGN PATENT DOCUMENTS

CN          103310202 A       9/2013
CN          104882025 A       9/2015
(Continued)

OTHER PUBLICATIONS

International Search Report for PCT/EP2017/072838, dated Dec. 12, 2017.

*Primary Examiner* — Shardul D Patel
(74) *Attorney, Agent, or Firm* — Norton Rose Fulbright US LLP; Gerard Messina

(57) ABSTRACT

A driver assistance system and a method for operating this driver assistance system, where signals of at least one surround sensor provided on the vehicle are evaluated, and if the evaluation reveals an increased probability of a collision with a detected object, emergency braking is automatically triggered and carried out, and in the event of an increased probability of a collision with a detected object, which lies above a second threshold value, the current vehicle position is stored, or the vehicle position within a predefined period of time after exceedance of the second threshold value is stored, and in the event of traveling through the spatial area about the vehicle position again, the stored information is taken into account for the triggering or (Continued)

the preparation of a warning of danger or emergency braking.

15 Claims, 3 Drawing Sheets

(51) Int. Cl.
*B60W 30/095* (2012.01)
*B60W 30/12* (2020.01)
*B60W 50/00* (2006.01)
*B60W 50/14* (2020.01)

(52) U.S. Cl.
CPC ........ *B60W 50/0097* (2013.01); *B60W 50/14* (2013.01); *G08G 1/166* (2013.01); *B60W 2420/42* (2013.01); *B60W 2420/52* (2013.01); *B60W 2422/95* (2013.01); *B60Y 2300/09* (2013.01)

(58) Field of Classification Search
CPC ......... B60W 2420/42; B60W 2420/52; B60W 2422/95; G08G 1/166; G08G 1/16; B60Y 2300/09
USPC ........................................................ 701/301
See application file for complete search history.

(56) References Cited

U.S. PATENT DOCUMENTS

| | | | |
|---|---|---|---|
| 7,877,209 B2 | 1/2011 | Harris et al. | |
| 9,812,016 B2* | 11/2017 | Oremus | G08G 1/166 |
| 2003/0004644 A1* | 1/2003 | Farmer | G08G 1/165 |
| | | | 701/301 |
| 2004/0019426 A1* | 1/2004 | Knoop | B60T 7/22 |
| | | | 701/301 |
| 2009/0012684 A1* | 1/2009 | Thiele | B60T 7/22 |
| | | | 701/70 |
| 2015/0161892 A1* | 6/2015 | Oremus | B60Q 1/525 |
| | | | 340/901 |

FOREIGN PATENT DOCUMENTS

| | | |
|---|---|---|
| DE | 10231558 A1 | 1/2003 |
| DE | 60003872 T2 | 7/2004 |
| DE | 102004052519 A1 | 5/2006 |
| JP | 2002074594 A | 3/2002 |

\* cited by examiner

DRIVER ASSISTANCE SYSTEM FOR A MOTOR VEHICLE

FIELD OF THE INVENTION

The present invention relates to a driver assistance system and a method for operating this driver assistance system, where signals of at least one surround sensor provided on the vehicle are evaluated, and if the evaluation identifies an increased probability of a collision with a detected object, emergency braking is automatically triggered and carried out, and in the event of an increased probability of a collision with a detected object, which lies above a second threshold value, the current vehicle position is stored, or the vehicle position within a predefined period of time after exceedance of the second threshold value is stored, and in the event of traveling through the spatial area about the vehicle position again, the stored information is taken into account for the triggering or the preparation of a warning of danger or of emergency braking.

BACKGROUND INFORMATION

A device for preventing a collision and/or reducing the consequences of a collision of a motor vehicle with an object is discussed in DE 10 2004 052 519 A1; with the aid of an object-detection sensor system, the position and velocity of an object with respect to the ego vehicle being ascertained, and as a function of these variables, it being ascertained if a collision is imminent, and emergency braking being triggered in response to a detected, imminent collision. In this context, the activity of the driver continues to be evaluated and is used for determining the triggering time.

SUMMARY OF THE INVENTION

The essence of the present invention is to provide a driver assistance system and a method for operating a driver assistance system, where positions, in particular, geodetic positions of the vehicle, which exhibit an increased triggering probability, are stored autodidactically, and therefore, the availability of the information to other drivers is increased, and the updating of the triggering information is increased, as well.

According to the present invention, this is achieved by the features of the independent claims. Advantageous further refinements and developments are derived from the dependent claims.

Within the scope of the present application, the term surround sensor is understood to mean a system, which is made up of at least one or more surround sensors; this at least one surround sensor being able to be at least one radar sensor, or at least one lidar sensor, or at least one ultrasonic sensor, or at least one video sensor, or a combination of one or more of the sensor types enumerated.

In addition, the term emergency braking is used, by which a deceleration of the vehicle is meant, which occurs at the maximum possible deceleration, or a deceleration, which approximately reaches the maximum possible vehicle deceleration, in order to decrease the collision probability of the vehicle with an object or with other vehicles as rapidly as possible.

A warning of danger includes warning the driver in a driving situation, by
    an acoustic and/or optical driver warning;
    build-up of a brake pressure;
    pre-charging of the brake system; and/or
    pressureless application of the brake pads to the brake disks.

Within the scope of the present invention, an increased probability of a collision with a detected object also includes a driving situation, in which a collision with a road user, in particular, with a vehicle, a pedestrian or a stationary object, during a driving maneuver of the ego vehicle may no longer be prevented, or may only be prevented by driving maneuvers, in which longitudinal or transverse accelerations are necessary, which are above the values that are perceived as comfortable by an average driver. In these cases, prevention of a collision is often only possible, by the ego vehicle's and the colliding object's each performing a collision-avoidance driving maneuver simultaneously.

An increased risk of collision may also be caused alone by the lane marking's of the reference traffic lane being crossed or left, without other road users' or stationary objects' being detected. Thus, in the scope of the present invention, in addition to the danger of a collision with other objects, the term collision risk also includes increased endangerment due to the current driving situation, without an acute collision being detectable.

The second threshold value, upon exceedance of which the current vehicle position is stored or the vehicle position within a predefined period of time after the exceedance of the second threshold value is stored, is associated with a lower collision probability than the first threshold value, upon exceedance of which a warning of danger or emergency braking is automatically prepared or triggered and carried out. Even in situations, in which a warning of danger has still not been issued or emergency braking is prepared or triggered and carried out, this already allows data regarding the dangerousness of the current driving situation, as well as their position, to be collected and stored, and therefore, to be provided for later driving situations as a position exhibiting increased potential danger, without having to make the driver aware of a warning of danger or emergency braking through this. This increases the driving safety prior to reaching the limits of danger, without the driver gaining knowledge through this and his/her attention being diverted from the driving action.

In addition, it is advantageous that when the current vehicle position is stored, a plurality of vehicle positions along a trajectory traveled are additionally stored. The additional plurality of vehicle positions along a traveled trajectory are vehicle positions, which have been ascertained during a predefined period of time, in particular, a predefined, past period of time. In this manner, not only the location of the increased potential risk may be analyzed, but also how the vehicle was controlled along its travel trajectory through the dangerous location, by which knowledge regarding an unfavorable course of the roadway may be acquired, or knowledge regarding frequent, erratic driver behavior may be acquired, or else particularly advantageous driver behavior while passing the dangerous location may be recognized and acquired.

Furthermore, it is advantageous that additional data are stored along with the storage of the current vehicle position or the additional plurality of vehicle positions along a trajectory traveled.

In this context, it is also advantageous that the further data are data regarding
    stationary objects in the detecting range of the surround sensor; and/or
    moving objects in the detecting range of the surround sensor; and/or
    detected traffic-lane markings; and/or ascertained collision probabilities; and/or
driver actions and/or
a movement profile of the vehicle; and/or
a combination of these.

In this context, the data may be mostly position information of the detected objects, which may be stationary objects, moving objects or traffic-lane markings, or position information, for which the increased collision probabilities have been ascertained, or position information, which includes driver reactions, such as the detection of accelerator pedal manipulation or brake pedal manipulation or steering wheel manipulation.

In addition, it is advantageous that the storage of the vehicle position or the vehicle positions of any further data at the time of exceedance of the second threshold value or within a predefined period of time after the exceedance of the second threshold value takes place in a storage medium carried in the vehicle. Alternatively, or in addition, it may advantageously be provided that the storage of the vehicle position or the vehicle positions of any further data at the time of exceedance of the second threshold value or within a predefined period of time after exceedance of the second threshold value take place in a stationary storage medium outside of the vehicle, and that to this end, the position data be transmitted from the vehicle to an infrastructure device via a wireless interface. In this context, the infrastructure device may be, for example, a cellular network or a data cloud, which provides a connection to the stationary storage medium on a majority of the route traveled. The stationary storage medium may be, for example, a central data server, to which the ego vehicle, but also other road users, have access, using their vehicle. In the case in which, at the triggering time or at the time of exceedance of the second threshold value, there is no radio communication between the vehicle and the stationary storage medium via the infrastructure device, it is conceivable for the data to be stored in a storage medium carried in the vehicle and to be transmitted to the infrastructure device upon renewed availability of the wireless interface.

In addition, it is advantageous that after the triggering of emergency braking, it is determined if the triggering was false triggering or the triggering was legitimate triggering, and the result is stored in the storage medium. This is accomplished in that after the ending, it is checked if a collision has occurred or a collision was able to be prevented by an automatically triggered braking action or an automatically triggered steering action. In this context, an example of an instance of false triggering is exceedance of the second limiting value without an intervention in the longitudinal vehicle guidance and/or the transverse vehicle guidance having been necessary. In the case of legitimate triggering, there was an actual increase in the potential danger, for example, from approaching other objects or leaving the traffic-lane markings of the ego vehicle.

In addition, it is advantageous that when traveling through the spatial area around the vehicle position, for which stored data are available in the storage medium, these data are made available to the vehicle. In this manner, it is also possible to notify, in good time, a vehicle, which has never traveled through the current dangerous location, of the dangerous location lying ahead, and to reduce the speed early on or to generate brake readiness of the vehicle, for example, by applying the brake pads to the brake disks or precharging the brake system with brake pressure.

Furthermore, it is advantageous that the first threshold value and/or the second threshold value may be changed as a function of the information provided by the storage medium. This refinement allows the vehicle to already be prepared early for the dangerous location and also to be warned more strongly and earlier of positions having a higher potential danger, than on sections of roadway having a lower potential danger. In this manner, it is possible to adaptively adjust the driver warning, as well as the preparation of the vehicle for the dangerous position.

In addition, it is advantageous that when traveling through the spatial area around the vehicle position, for which stored information is available in the storage medium, the first threshold value and/or the second threshold value are changed in such a manner, that at locations at which driving situations having an elevated collision risk have increasingly been detected, the threshold values are lowered, which means that a warning of danger or emergency braking may be prepared or triggered and carried out earlier, and therefore, the current situation may be responded to more effectively than without this adjustment.

Furthermore, it is advantageous that when traveling through the spatial area about the vehicle position, for which stored information is available in the storage medium, and for which an increased risk of collision has been detected, a maximum speed is recommended to the driver of the vehicle prior to reaching the position having the increased risk of collision.

In an advantageous manner, it may also be provided that structural conditions be considered in the determination of the maximum speed to be recommended; bridge passages, tunnel passages, traffic circles or other objects on the side of the road being able to be considered as structural conditions. In this context, it is also possible for information, which communicates if one of these structural conditions is present at the position soon to be traveled through, to be provided in the stationary storage medium or additionally by a navigation system; it is also possible for the surround sensor of the vehicle to be able to recognize these structural conditions, and for their presence at the expected position to be considered.

The implementation of the method of the present invention in the form of a control element, which is provided for a control unit of an adaptive cruise control of a motor vehicle or of an emergency braking function, is of particular importance. In this context, a program that is executable on a computing element, in particular, on a microprocessor or signal processor, and which is suitable for implementing the method according to the present invention, is stored in the control element. Thus, in this case, the present invention is implemented by a program stored in the control element, so that this control element provided with the program constitutes the present invention in the same manner as the method, which the program is suited to implement. In particular, an electrical storage medium, for example, a read-only memory, may be used as a control element.

Additional features, uses and advantages of the present invention ensue from the following description of exemplary embodiments of the present invention, which are illustrated in the figures of the drawing. In this context, all of the features described or represented, either alone or in any combination, constitute the subject matter of the present invention, regardless of their combination in the patent claims or their antecedent reference, and regardless of their wording and representation in the specification and in the drawing, respectively.

Exemplary embodiments of the present invention are explained below with reference to the drawing.

DETAILED DESCRIPTION

Figure 1:
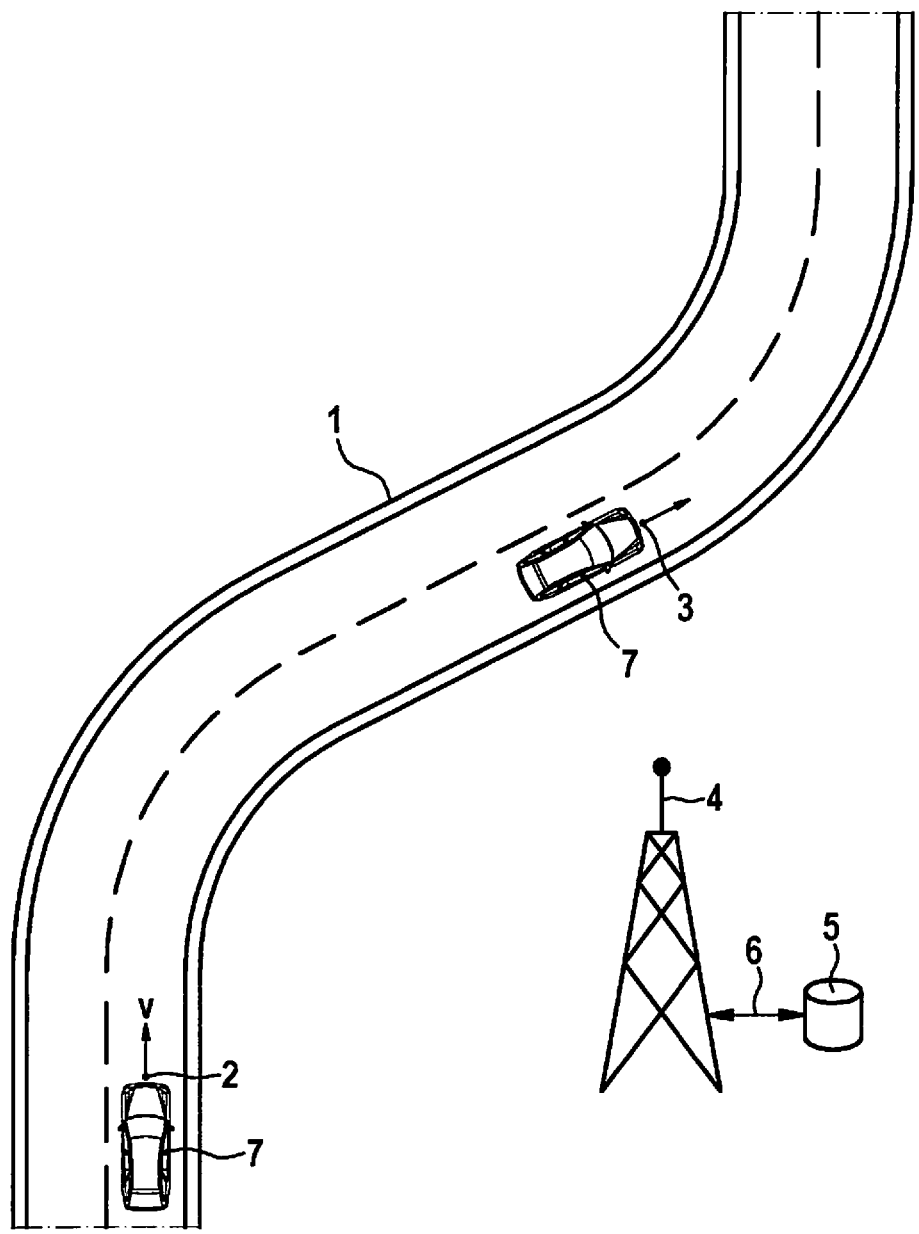
FIG. 1 shows a representation of an example of a driving situation for explaining the method of the present invention.

FIG. 1 shows a road 1, which includes dangerous locations in its depicted course, for example, due to curves, restrictions, sections having poorly visible road markings, or similar conditions. A vehicle 7, which is illustrated at a first position 2 and at a second position 3, is traveling on this road 1. Vehicle 7 moves at a velocity v and includes a driver assistance system, which monitors the surrounding area of the vehicle with the aid of at least one surround sensor provided. Using the data provided by the surround sensor, as well as further data provided by the vehicle, it is possible for the driver assistance system to recognize a current, dangerous situation, for example, by calculating a potential for danger and comparing it to a first threshold value. If the calculated danger value exceeds the first threshold value, then it is possible for the driver to be informed and, in some instances, warned of the dangerous situation acoustically, optically or in another manner, or else for the driver assistance system to intervene automatically in vehicle components, in order to control the dangerous situation, for example, using a steering action, a braking action or the triggering of safety devices.

In addition, the currently ascertained danger value, which represents the probability of a collision with a detected object, as well as further vehicle data of vehicle 7, are acquired and stored in a storage medium 5, which may be, for example, a stationary data server. To this end, a radio link to an infrastructure service, for example, a cellular service, is maintained by vehicle 7 during operation, since the transmitting and receiving device of vehicle 7 maintains radio communication with a wireless infrastructure device, for example, a radio base station of a cellular network. Using the transmitting and receiving device of wireless infrastructure device 4, the data supplied by vehicle 7 may be transmitted via a data transmission circuit 6 to a storage medium 5, which may be, for example, a data server in a computer center. These data may include, for example, the current vehicle position, a time information item, vehicle data, such as the longitudinal vehicle speed, transverse vehicle speed, longitudinal vehicle acceleration, transverse vehicle acceleration, as well as other features, such as the evaluation, on the basis of which an increased risk of danger was determined. These data may include, for example, an information item regarding whether the current traffic-lane marking has been detected, whether other objects have been detected in the surroundings of the vehicle, whether the driver is presently attentive, as well as whether any other driver assistance systems, such as occupant restraint devices, have been triggered or their triggering has been prepared. However, these data are not initially acquired and transmitted when the danger value exceeds the first threshold value, since safety activities are already necessary at this time; but such data are already acquired and transmitted to storage medium 5 as soon as a second threshold value is exceeded, which is lower than the first threshold value. This allows data regarding dangerous situations to be provided, even before safety systems trigger or are readied for triggering.

In storage medium 5, which may alternatively be implemented as an internal vehicle storage medium, as well, and then records and keeps only data regarding the ego vehicle ready, the supplied data are converted to a type of "danger map" by holding the danger information ready, using the transmitted position information regarding the respective map sections. The database in storage medium 5 acquired in this manner may subsequently be made available to the other road users again.

This may be accomplished in that when vehicle 7 is moving on a road 1, this vehicle 7 transmits its current location, as well as the future locations based on the road traveled upon, to wireless infrastructure device 4 via the wireless interface, and may therefore request, from storage medium 5, danger information regarding the dangerous locations, which will be on the future travel path of vehicle 7 on road 1. Consequently, vehicle 7 may receive data from storage medium 5, which were supplied by other road users at earlier times and thus indicate possible future dangerous locations to ego vehicle 7 and to the driver in a timely manner, and may set warning and intervention thresholds appropriately.

During the processing, storage and retrieval of the position-specific data, it is possible to store data of all trips of vehicles, which have passed this location and, in so doing, detected an increased danger or an increased collision probability. Alternatively, or in addition, it is possible to store data of all trips of vehicles, which have passed this position, since in this manner, a frequency of the increased potential danger may be determined with respect to all of the passing road users; the elevated potential danger being able to be outputted, for example, as a percentage. Alternatively, or in addition, it is also possible for the sections of road 1 to be outputted in danger classes, so that sections of road could be assigned different classes, such as red, yellow or green, which each represent different levels of danger. It is also conceivable for the unprocessed data transmitted by the vehicles to be stored additionally as raw data and kept ready for retrieval events, so that these data are available for evaluations of collision research.

Vehicle 7, which, at position 2 of FIG. 1, is about to pass through a right-hand curve, is traveling on road 1 at a speed v. In this context, vehicle 7 is in communication with a storage medium 5, which is connected to a cellular network via, for example, a data transmission circuit 6, and is connected to vehicle 7 via a cellular connection. This first curve is a curve not exhibiting a situation of high danger, which means that while passing through it, neither a driver warning is issued, nor a safety measure is triggered or prepared, since the danger, i.e., the collision probability, does not exceed the first threshold value. However, it is still possible for a situation of increased danger to be detected on the basis of the traffic-lane markings or a poor roadway foundation, and for the second threshold value, which is lower than the first threshold value, to still be exceeded. In this case, the position information, which describe the trajectory traveled by the vehicle, in addition to further vehicle variables, such as longitudinal vehicle speed, transverse vehicle speed, longitudinal vehicle acceleration, transverse vehicle acceleration, and possibly further data, such as an ESP action, local coefficients of friction of the foundation traveled upon, are ascertained, and these data are transmitted from vehicle 7, via a cellular transmitting and receiving device, to infrastructure device 4, from where these data are transmitted to storage medium 5 and stored there. If the same vehicle 7 travels through the same position 2 at a later time, or another vehicle soon passes through the same position 2, then this vehicle may be supplied information by storage medium 5 about the possible, dangerous situation frequently occurring at this location, so that the driver may be warned to reduce the speed, or safety devices, such as a driving dynamics system, may be adapted by adjusting the intervention thresholds predictively.

If vehicle 7 continues to travel on road 1 along its course, then it passes through position 3, where, for example, due to a sharp curve, a level of danger increased in this manner is identified, or, because of frequent overrunning of the center line by the driver, a common, dangerous situation is generated; this danger or collision probability being able to be so high, that both the lower, second threshold value and the higher, first threshold value are exceeded, which means that first of all, a driver warning is initiated or even safety devices, such as an ESP action or tensioning of the safety belt, are triggered, and secondly, as at position 2, the position data and vehicle variables are acquired and transmitted to storage medium 5 via the infrastructure service, which may be a cellular service; in this case, upon passing through position 3, data regarding the overrunning of the center line or the ESP action also being acquired and transmitted.

Figure 2:
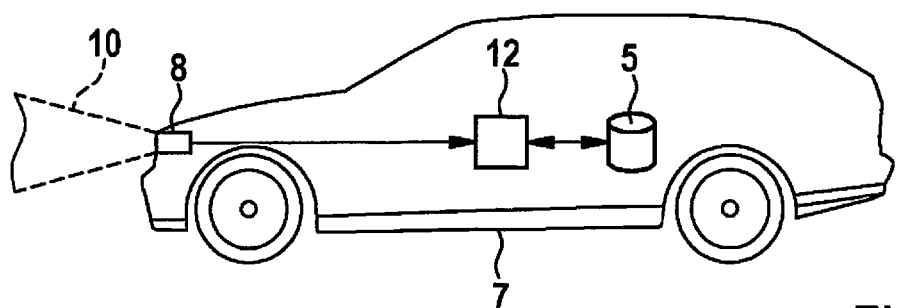
FIG. 2 shows a schematic representation of a specific embodiment of the driver assistance system according to the present invention.

A possible specific embodiment of a vehicle 7 is depicted by way of example in FIG. 2. Once again, a vehicle 7 is shown, which includes a surround sensor of a driver assistance system 8; the surround sensor being able to be mounted, for example, to the vehicle front end. For example, this surround sensor 8 may be one or more sensors, which monitor the vehicle surroundings in different directions and at different distances, and may, for example, take the form of radar sensors, lidar sensors, video sensors, or ultrasonic sensors, or a combination of them. In the depicted exemplary embodiment of FIG. 2, this surround sensor 8 has a detecting range 10, which monitors the vehicle surroundings in front of vehicle 7 and therefore detects objects, which approach or travel ahead of vehicle 7 or are positioned at the edge of the roadway. In addition, it is provided that surround sensor 8 be able to detect traffic-lane markings and/or traffic signs. In this manner, it is possible for the information item, which is provided by surround sensor 8 and is transmitted in the vehicle to control unit 12, to be evaluated there with regard to a dangerous situation up ahead. If, for example, an approaching vehicle, which is on a collision course with ego vehicle 7, is ascertained, or a vehicle, which is traveling ahead and being followed at too short a distance, is detected, so that a rear-end collision is imminent, or it is recognized that ego vehicle 7 is leaving or has already left the traffic lane of road 1 situated ahead, then this may be detected by the control unit of driver assistance system 12, and the current position coordinates ascertained by vehicle 7 may be stored in a storage medium 5 inside the vehicle. In this context, in addition to the local position, further data describing the dangerous situation may be stored. In addition, it may be useful for not only the current vehicle position to be stored, but also for the vehicle positions along the traveled vehicle trajectory, as well as vehicle data describing the dangerous situation over a certain period of time, to be stored in the storage medium 5 inside the vehicle. If road 1 is traveled upon again at a later time, then, based on the stored location data, vehicle 7 may recognize that a dangerous location will soon be traveled through, and through this, vehicle 7 may be prepared in its warning thresholds and interventions of the driver assistance system in safety systems and may be adapted with regard to the intervention thresholds on the basis of the latest dangerous situation.

Figure 3:
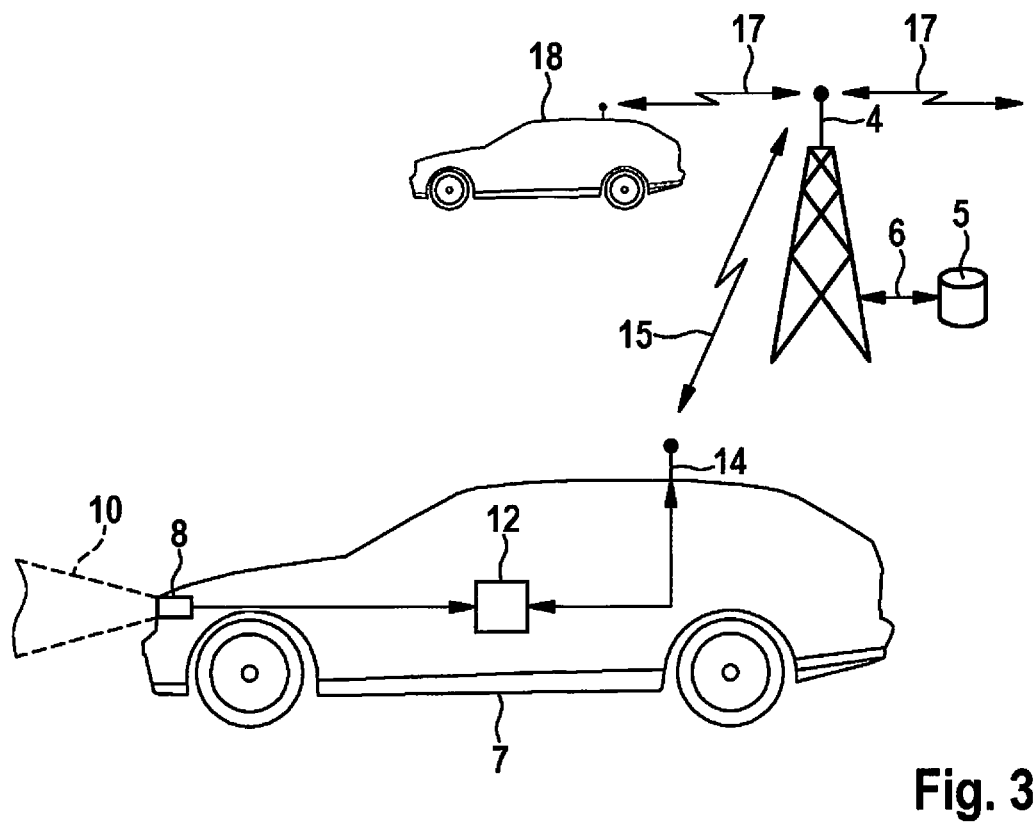
FIG. 3 shows a further schematic representation of a further exemplary view of the driver assistance system according to the present invention.

A specific embodiment of the system of the present invention is depicted again in FIG. 3; in this case, a vehicle 7 again being depicted. This vehicle 7 has, in turn, a surround sensor 8 including a detecting range of driver assistance system 10, as described with regard to FIG. 2. In this exemplary embodiment, as well, a control unit for driver assistance system 12 is, in turn, depicted, which is supplied the data that is ascertained by surround sensor 8 and is in regard to detected objects in the surrounding area and driving situations. The control unit for driver assistance systems 12 ascertains if a dangerous situation is currently being detected by surround sensor 8 and recognized by the driver assistance system. According to the exemplary embodiment depicted, vehicle 7 does not have its own storage medium 5, but is connected to a stationary storage medium 5. To this end, a mobile wireless interface 14, for example, in the form of a transceiver or a mobile radio unit, to which control unit 12 is connected, is provided on vehicle 7. During the trip, this mobile wireless interface 14, which may be, for example, a cellular receiver and transmitter, independently establishes a radio link 15 to a wireless infrastructure device 4, which may be, for example, a radio base station of a cellular network. These wireless infrastructure devices 4 are connected via data transmission circuits 6 to stationary storage medium 5, which is implemented, for example, as a data server in a computer center. If the control unit detects a dangerous situation and exceedance of the probability value of a dangerous situation, which lies above the second threshold value, then data regarding the vehicle position and regarding the dangerous situation are transmitted via mobile wireless interface 14 and radio link 15 to wireless infrastructure device 4, which transmits them to storage medium 5 via data transmission circuit 6.

In this manner, during its operation, vehicle 7 may transmit its current location to the data server, using storage medium 5, and inquire if, with regard to the roadways traveled upon in the future, there are data regarding dangerous positions. If, in storage medium 5, sections of roadway, which exhibit an increased collision risk or risk of danger, are found in the "danger map," then the data correspondingly stored in storage medium 5 may be made available to vehicle 7, so that vehicle 7 and its driver already know beforehand, when a dangerous location will appear and which type of danger predominates at this dangerous location. Regarding the type of dangerous location, a distinction may be made, for example, as to whether the routing of road 1 includes structural dangers, for example, from sharp curves, potholes in the road or poor or missing road markings, or whether a section of roadway exhibiting increased collision risk includes additional road users, for example, in the case of blind junctions or intersections, and consequently, a longitudinal vehicle guidance system and/or vehicle steering system is adjusted early to the forthcoming dangerous situation, for example, by reducing adjusted speed v of ego vehicle 7 or activating safety systems early or adapting them with regard to their intervention thresholds, to the driving situation to be expected.

The information stored in stationary storage medium 5 may also be outputted to further vehicles 18 via data transmission circuit 6 and wireless infrastructure device 4, the further vehicles being likewise connected to wireless infrastructure device 4 by their own radio links 17. In this manner, it is possible for all of the data acquired in dangerous situations to already be made available to all other road users 18 beforehand, and therefore, for the vehicle guidance to be adjusted for their safety systems and vehicle control systems, to the specific dangerous location situated up ahead.

Figure 4:
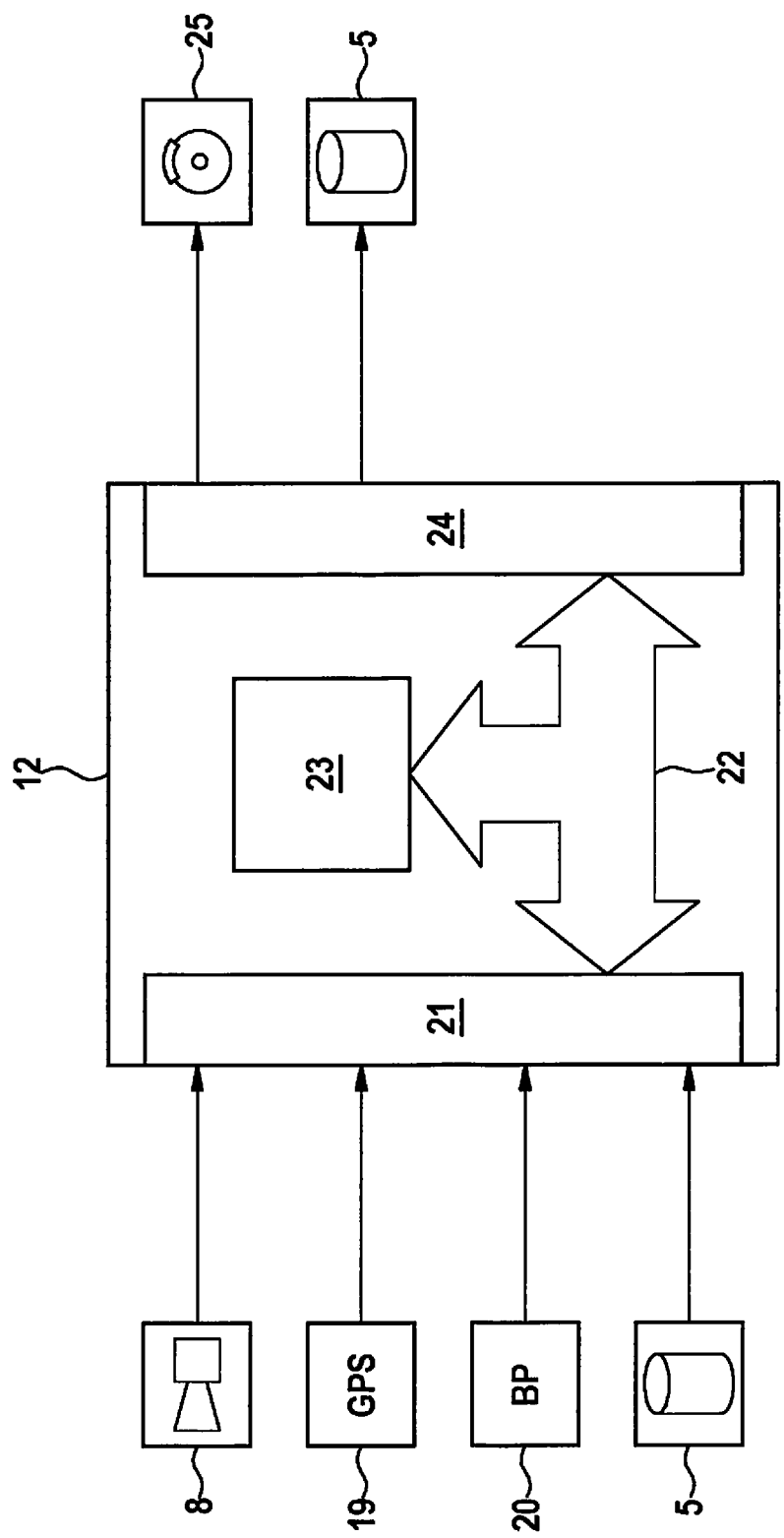
FIG. 4 shows a schematic representation of a specific embodiment of the driver assistance system of the present invention, in the form of a block diagram.

A specific embodiment of the device of the present invention, in which control unit 12 is shown in greater detail, is represented in FIG. 4. The control unit for a driver assistance system 12 includes an input circuit 21, which may be fed output signals of sensors and storage devices. Thus, input circuit 21 is fed the output signal of a sensor of a driver assistance system 8, for example, a list of objects detected in the vehicle surroundings, which were identified with the aid of a radar sensor, a video sensor or a lidar sensor. In this context, the sensor system represented as a surround sensor of a driver assistance system 8 may also be made up of a plurality of sensors; a plurality of sensors of different sensor technologies, such as radar and/or video and/or lidar, also being able to be provided. In addition, input circuit 21 is fed the output signal of a position sensor 19, which may be implemented, for example, as a GPS position finding device. In this context, the output signal of this GPS sensor represents the global spatial coordinates of vehicle 7. Furthermore, input circuit 21 is fed output signals of one or more driver-operated devices 20. In particular, a brake pedal sensor may be provided as a driver-operated device; the brake pedal sensor determining if the driver is currently manipulating the brake pedal, and if yes, then to what extent, and at what rate he/she is doing this. Alternatively, or in addition, an accelerator pedal may be provided as a driver-operated device; the accelerator pedal determining if the driver is currently inputting an acceleration command, and if yes, to what degree this acceleration command is communicated to the vehicle via the accelerator pedal. A steering-wheel angle sensor of a steering wheel, or operating devices for setting automatic vehicle guidance functions or driver assistance functions, may be provided as alternative or additional driver-operated devices 20. Furthermore, data of a storage medium 5 are made available to input circuit 21; storage medium 5 being able to be a storage medium inside the vehicle or a stationary storage medium 5 outside the vehicle; the storage medium being connected to the vehicle via a wireless interface, or being able to be implemented as a combination of the two variants.

The input data fed to input circuit 21 are supplied to a computation device 23, which may take the form of a microprocessor, signal processor or microcontroller, via a data exchange device 22, which may advantageously take the form of a bus system. In this computation device 23, output data are ascertained as a function of the input data, since in the computation device, an algorithm taking the form of software is provided for executing the method according to the present invention. In this case, from the supplied input data, it may be ascertained, if a dangerous situation is currently present, but also ascertained if, on the basis of the data supplied by storage medium 5, a dangerous situation will soon occur. Computation device 23 is also able to ascertain suitable threshold values for triggering or preparing warnings of danger or emergency braking, and in response to exceedance of the second threshold value, to supply the data currently obtained to a storage medium 5 via output circuit 24; the data being able to be stored and/or evaluated in the storage medium. In this context, storage medium 5, which is connected to output circuit 24, may be identical to the storage medium 5, which is connected to the input circuit. However, it is also possible for them to be different storage media, which, for example, administer the same database, or storage media, in which different databases or different parts of the same database are stored.

Subsequently, the output signal of output circuit 24 is supplied to deceleration device 25 of the vehicle, in order to be able to trigger emergency braking in the case in which it is necessary. In this instance, in addition to deceleration device 25, a restraining device for vehicle occupants or a steering system of vehicle 7 may also be activated, the latter of which, for example, carries out an evasive maneuver adequate for the situation or adjusts the course of vehicle 7 to the routing of road 1.

If the vehicle having the driver assistance system of the present invention approaches a position, which is stored as a dangerous position in storage medium 5, then the driver assistance system may warn the driver beforehand, in good time. At this point, if emergency braking has already been triggered several times, then this situation may also be stored in storage medium 5, and this information may be made available to the other road users. In addition, whether the emergency braking was an instance of false triggering or an instance of legitimate triggering, may be stored in storage medium 5. If one approaches such a dangerous location, at which emergency braking is increasingly triggered and, in this case, instances of false triggering have increasingly been detected, then the driver assistance system may react to this appropriately, for example, by modifying the triggering of emergency braking. In this context, as a modification of the emergency braking, the braking may be omitted completely, and only a driver warning may take place. In addition, it is conceivable for the modification to be, that the first threshold value is changed and emergency braking is triggered already at low, or only at high danger thresholds or collision probabilities. Furthermore, it is conceivable for emergency braking to be triggered, but for this to be limited to a maximum deceleration, which is less than the maximum possible deceleration, which is used in the case of unmodified emergency braking. Moreover, it is conceivable that the modified emergency braking already begins deceleration earlier, prior to reaching the dangerous position, but that this deceleration has a lower intensity than unmodified emergency braking. A further option for modifying the emergency braking is, in addition to the warning, to briefly jerk the brakes, in order to warn the driver even more strongly than by only an acoustic or optical warning and to thereby shift the brake system simultaneously into brake readiness. In addition, as a modification of the emergency braking, it is possible to activate alternative functions or a combination of the above-described modification options simultaneously or sequentially in series.

After a vehicle passes the dangerous location and continues traveling on the intended route, it is possible to deactivate the modification and carry out a reset to the emergency braking originally intended.

What is claimed is:

1. A driver assistance system for a motor vehicle, comprising:
   a driver assistance device configured to perform the following:
      evaluate signals of at least one surround sensor on the motor vehicle to determine a probability of a collision with a detected object;
      in response to the determined probability being above a first threshold value, trigger output of a warning of danger;
      in response to the determined probability being below the first threshold value and above a second threshold value, store a current position of the vehicle or a position of the vehicle within a predefined period of time after exceedance of the second threshold value without triggering the output of the warning of the danger; and subsequently, in response to a spatial area about the stored position being traveled through again, triggering the output of the warning of the danger based on the stored position.

2. The driver assistance system of claim 1, wherein, in response to the determined probability being below the first threshold and above the second threshold, the driver assistance device is configured to store the current position of the vehicle and also a plurality of vehicle positions along a traveled trajectory.

3. The driver assistance system of claim 1, wherein, in response to the determined probability being below the first threshold and above the second threshold, the driver assistance device is configured to additionally store non-position data.

4. The driver assistance system of claim 3, wherein the non-position data relate to at least one of: stationary objects in the detecting range of the surround sensor; moving objects in the detecting range of the surround sensor; detected traffic-lane markings; ascertained collision probabilities; driver actions; and a movement profile of the motor vehicle.

5. The driver assistance system of claim 1, wherein the storage occurs onto a storage medium carried in the motor vehicle.

6. The driver assistance system of claim 1, wherein the storage is into a stationary storage medium outside of the motor vehicle, and is performed based on a data transmission from the motor vehicle to an infrastructure device using a wireless interface.

7. The driver assistance system of claim 6, wherein, in response to traveling through the spatial area, the stored information is made available to the motor vehicle.

8. The driver assistance system of claim 1, wherein the first threshold value and/or the second threshold value is changed as a function of the stored position.

9. The driver assistance system of claim 1, wherein, subsequent to the storage, in response to traveling through the spatial area, the first threshold value and/or the second threshold value are changed in such a manner, that at locations at which driving situations having an increased collision risk have increasingly been detected, the first threshold value and/or the second threshold value is lowered, so that the warning of danger is triggered to be output earlier than prior to the change.

10. The driver assistance system of claim 1, wherein, in response to traveling through the spatial area after the storage, a maximum speed is recommended to the driver of the motor vehicle prior to reaching the position.

11. The driver assistance system of claim 10, wherein structural conditions are taken into account in the determination of the maximum speed to be recommended.

12. The driver assistance system of claim 11, wherein at least one of the following are considered to be structural conditions: bridge passages, tunnel passages, traffic circles, and roadside objects on the outside of the curve.

13. A driver assistance system for a motor vehicle, comprising:
a driver assistance device configured to perform the following:
evaluate signals of at least one surround sensor on the motor vehicle to determine a probability of a collision with a detected object;
in response to the determined probability being above a first threshold value, trigger an automatic emergency braking;
in response to the determined probability being below the first threshold value and above a second threshold value, store a current position of the vehicle or a position of the vehicle within a predefined period of time after exceedance of the second threshold value without triggering the automatic emergency braking; and
subsequently, in response to a spatial area about the stored position being traveled through again, triggering the automatic emergency braking based on the stored position.

14. The driver assistance system of claim 13, wherein, after the triggering of the automatic emergency braking, it is determined if the triggering was an instance of false triggering or the triggering was an instance of legitimate triggering, and the result is stored.

15. The driver assistance system of claim 14, wherein, in response to the travel of the spatial area, where the triggering was determined to have been the instance of the false triggering, at least one of the following is satisfied: the emergency braking is deactivated completely; the emergency braking is limited to a lower maximum deceleration value; the deceleration function is degraded; and/or an alternative function is activated for reducing danger.

* * * * *